(12) United States Patent
Kapoor et al.

(10) Patent No.: US 11,437,861 B2
(45) Date of Patent: Sep. 6, 2022

(54) TEST OBJECT HOLDER

(71) Applicant: Apple Inc., Cupertino, CA (US)

(72) Inventors: Daman Kapoor, Cupertino, CA (US);
Fei Zhao, Cupertino, CA (US);
Matthew A Tamashiro, Cupertino, CA (US); Jiahui J Dong, Cupertino, CA (US); Jeffrey Douglas Louis, Auckland (NZ); Michael Victor Paauwe, Auckland (NZ); Ryllian Zhang, Auckland (NZ)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/546,201

(22) Filed: Aug. 20, 2019

(65) Prior Publication Data

US 2020/0067353 A1    Feb. 27, 2020

Related U.S. Application Data

(60) Provisional application No. 62/880,870, filed on Jul. 31, 2019, provisional application No. 62/721,415, filed on Aug. 22, 2018.

(51) Int. Cl.
*H02J 50/60* (2016.01)
*G01K 7/02* (2021.01)
*G01K 1/14* (2021.01)

(52) U.S. Cl.
CPC ............. *H02J 50/60* (2016.02); *G01K 1/14* (2013.01); *G01K 7/02* (2013.01)

(58) Field of Classification Search
CPC .............. G01K 1/14; G01K 7/02; H02J 50/60

USPC .................................. 374/179, 208, 152, 45
See application file for complete search history.

(56) References Cited

U.S. PATENT DOCUMENTS

| | | | |
|---|---|---|---|
| 10,505,403 B1* | 12/2019 | Smith | H01C 7/008 |
| 2012/0306521 A1† | 12/2012 | Nickel | |
| 2013/0163635 A1* | 6/2013 | Karanth | H02J 50/10 374/45 |
| 2013/0181724 A1* | 7/2013 | Teggatz | H02J 50/12 324/629 |
| 2016/0282192 A1* | 9/2016 | Wikstrand | G01K 1/14 |
| 2019/0131826 A1* | 5/2019 | Park | H02J 50/12 |
| 2020/0076244 A1* | 3/2020 | Smith | H02J 50/60 |
| 2021/0091606 A1* | 3/2021 | Johnston | H02J 50/20 |

(Continued)

FOREIGN PATENT DOCUMENTS

| | | |
|---|---|---|
| CN | 202534774 U | 11/2012 |
| CN | 202886252 U | 4/2013 |

(Continued)

OTHER PUBLICATIONS

Hong, et al., "Wireless Power Transmission Technology and Qi Standards," Information Technology & Standardization, 2018(03), Mar. 10, 2018.

(Continued)

*Primary Examiner* — Mirellys Jagan
(74) *Attorney, Agent, or Firm* — Fletcher Yoder PC (57) ABSTRACT

A testing assembly comprising a test object and a test object holder. The test object holder includes a body with an aperture defined therethrough. The test object is located in the aperture and an adhesive sheet is positioned over the aperture and the test object to retain the test object in place during testing.

61 Claims, 9 Drawing Sheets

(56) References Cited

U.S. PATENT DOCUMENTS

| | | | |
|---|---|---|---|
| 2021/0210990 A1* | 7/2021 | Muratov | H02J 50/60 |
| 2021/0226667 A1* | 7/2021 | Swaans | G01R 29/0892 |
| 2022/0094208 A1* | 3/2022 | Muratov | H02J 50/12 |

FOREIGN PATENT DOCUMENTS

| | | |
|---|---|---|
| CN | 204086283 U | 1/2015 |
| CN | 204101660 U | 1/2015 |
| CN | 204903578 U | 12/2015 |
| CN | 205484572 U | 8/2016 |
| CN | 105987763 A | 10/2016 |
| CN | 205786855 U | 12/2016 |
| CN | 106453701 A | 2/2017 |
| CN | 106685029 A | 5/2017 |
| CN | 107871600 A | 4/2018 |
| CN | 207300272 U | 5/2018 |
| CN | 210571059 U | 5/2020 |
| WO | 2016057786 A1 | 4/2016 |

OTHER PUBLICATIONS

Wireless Power Consortium, "Introduction to the Power Class 0 Specification," ver. 1.2.3, Feb. 2017.

Audio/video, information and communication technology equipment—Part 1: Safety Requirements, International Standard, Oct. 2018, Edition 3, International Electrotechnical Commission, Geneva, Switzerland.

Audio/video, information and communication technology equipment—Part 1: Safety Requirements, International Standard, Feb. 2014, Edition 2, International Electrotechnical Commission, Geneva, Switzerland.

AVID, "Qi Foreign Object v1.2 Upgrade", 1 page, publicly available in Dec. 2016, https://www.avid-tech.com/wpcontent/uploads/2016/12/AVID-Qi-Foreign-Objects-v1.2Upgrade-r1.pdf, AVID Product Brochure.† nok9, "CATS I Base Station Tester", pp. 1-8, Publicly available Feb. 2018, https://www.nok9.com/wpcontent/uploads/2018/02/CATS-,-BST-2.2.pdf.†

AVID Technologies, "FOD Receiver User's Guide," pp. 1-9, Rev 3, Jul. 18, 2013, AVID technologies, Twinsburg, Ohio.†

\* cited by examiner
† cited by third party

TEST OBJECT HOLDER

This patent application claims the benefit of provisional patent application No. 62/880,870, filed on Jul. 31, 2019, and provisional patent application No. 62/721,415, filed on Aug. 22, 2018, which are hereby incorporated be reference herein in their entireties.

FIELD

This relates generally to wireless power transfer and, more particularly, to foreign object detection for wireless power transfer devices.

BACKGROUND

In wireless power transfer systems, a wireless power transmitting device wirelessly transmits power to a wireless power receiving device. The wireless power receiving device receives the wirelessly transmitted power and provides power to charge an internal battery or to power the receiving device.

Wireless power transmitting devices may include one or more transmitting coils which generate a magnetic field and define a charging region (for example, transmitting devices with a charging surface or a charging volume). Provided the receiving device is located in sufficient proximity to the charging area or zone, wireless power transfer may be achieved.

Foreign objects, such as metallic objects like coins or rings, located in proximity to the magnetic field of such wireless power systems may intercept wireless power intended for a receiving device. Also, the magnetic field may induce eddy currents in the foreign object. Wireless power systems, and in particular transmitting devices, may be tested to determine what effect they have on the wireless charging experience.

Accordingly, various standards have been outlined to enable such testing of wireless power systems. For example, the standards outlined in the Wireless Power Consortium (WPC) Qi Specification v1.2.3 and IEC 62368-1 (Edition 3). Qi Specification v1.2.3 specifies a test which includes positioning a representative foreign object between the test transmitting device and test receiving device and then measuring the temperature of the representative foreign object over a period of time as power is transmitted by the test transmitting device. As the test is highly dependent on the location of the representative foreign object relative to the test transmitting device and test receiving device, a holder frame that allows tests to be reliably and consistently repeated without influencing the outcome is desired.

DETAILED DESCRIPTION

A wireless power system has a wireless power transmitting device that transmits power wirelessly to a wireless power receiving device. The wireless power transmitting device is a device such as a wireless charging mat, wireless charging puck, wireless charging stand, wireless charging table, or other wireless power transmitting equipment. The wireless power transmitting device may be a stand-alone device or built into other electronic devices such as a laptop or tablet computer, cellular telephone or other electronic device. The wireless power transmitting device has one or more coils that are used in transmitting wireless power to one or more wireless power receiving coils in the wireless power receiving device. The wireless power receiving device is a device such as a cellular telephone, watch, media player, tablet computer, pair of earbuds, remote control, laptop computer, electronic pencil or stylus, other portable electronic device, or other wireless power receiving equipment.

During operation, the wireless power transmitting device supplies alternating-current signals to one or more wireless power transmitting coils. This causes the coils to transmit alternating-current electromagnetic signals (sometimes referred to as wireless power signals) to one or more corresponding coils in the wireless power receiving device. Rectifier circuitry in the wireless power receiving device converts received wireless power signals into direct-current (DC) power for powering or charging the wireless power receiving device.

Wireless power transmitting and receiving devices can be designed to cooperate specifically with each other. For example, the size, shape, number, dimensions and configuration of coils of one or both of the devices may be selected based on the other device. Magnetic elements may also be included in the transmitting and/or receiving device, and the size, shape, number, dimensions and configuration of the magnetic elements may be selected based on the other device.

In some cases, wireless power transmitting and receiving devices can be designed to be closely coupled to each other. Typically, this is achieved by arranging the coils of the transmitting and receiving devices such that they are aligned with and close to each other in use. Systems in which the transmitting and receiving devices can be closely coupled to each other in use are sometimes referred to as inductive power transfer systems. Transmitting and receiving devices that can be closely coupled to receiving devices are sometimes referred to as inductive power transfer devices.

Wireless power transmitting and receiving devices can also be designed to cooperate with each other in particular orientations, positions or other spatial relationships. For example, some receiving devices may have a preferred position or orientation with respect to a transmitting device. This preferred position or orientation may allow for good power transfer, minimum leakage of the charging field and other advantageous effects. The transmitting and/or receiving devices may have visual markings to indicate where or in what orientation to place the receiving device, engaging elements to hold the receiving device in a particular position or orientation, magnetic couplings or other biasing elements to urge the receiving device towards a particular position or orientation, or other arrangements.

Wireless power transmitting and receiving devices can also be used with other devices without being specifically designed to cooperate with them. For example, a wireless power transmitting device can operate with many different types of receiving devices having different coil arrangements, different (or no) magnetic elements, sizes, shapes and other characteristics. A wireless power receiving device can operate with many different types of transmitting devices having different coil arrangements, different (or no) magnetic elements, sizes, shapes and other characteristics.

Wireless power transmitting and receiving devices can also be used in various orientations, positions or other spatial relationships. For example, wireless power transmitting or receiving devices may be provided without visual markings, engaging elements, magnetic couplings or other biasing elements, or other arrangements. Alternatively, transmitting or receiving devices may have these arrangements but still operate in various other orientations and positions.

Figure 1:
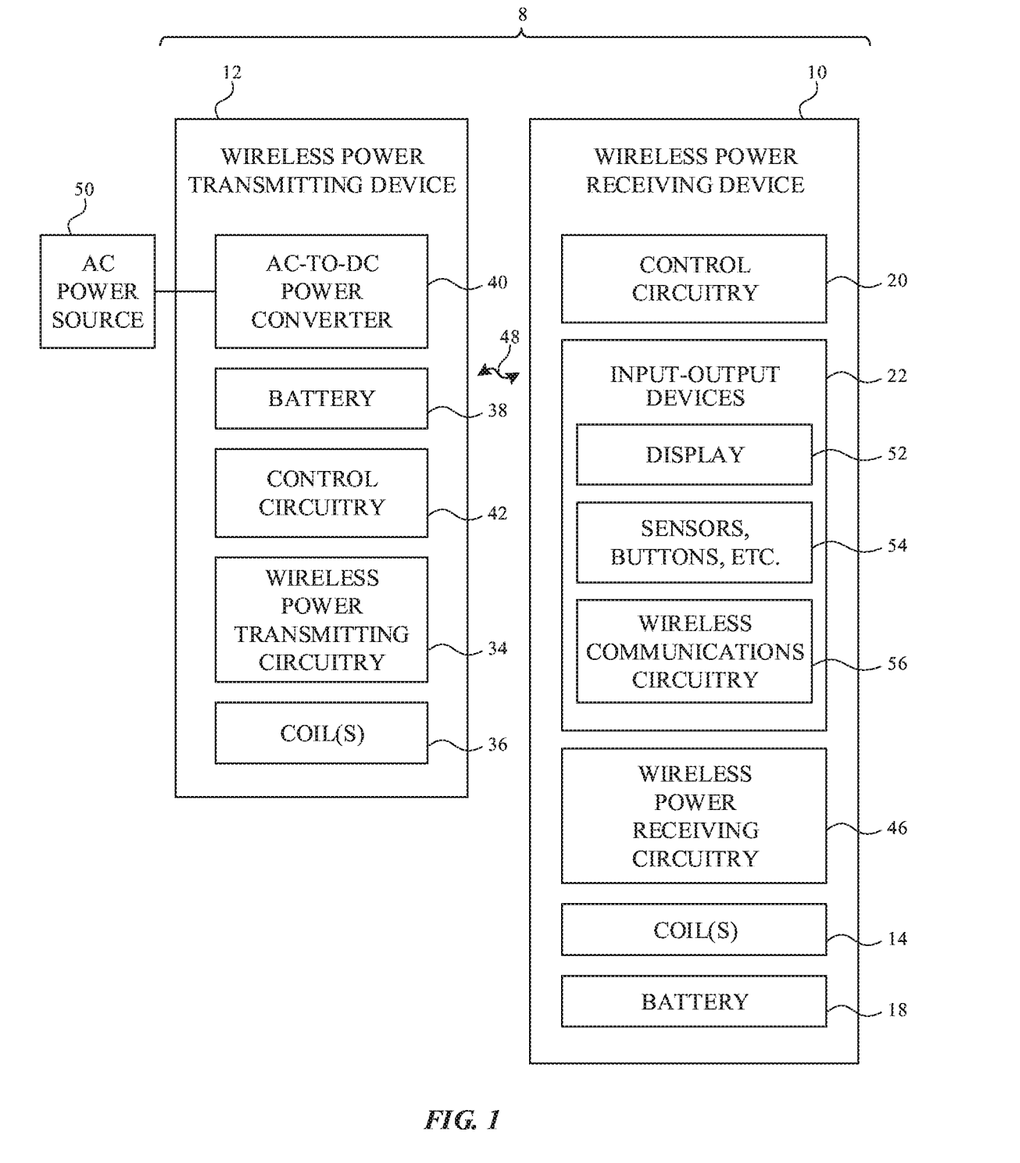
FIG. 1 is a schematic diagram of an illustrative wireless power system in accordance with some embodiments.

An illustrative wireless power system is shown in FIG. 1. As shown in FIG. 1, a wireless power system 8 includes a wireless power transmitting device 12 and one or more wireless power receiving devices such as wireless power receiving device 10. Device 12 may be a stand-alone device such as a wireless charging mat, may be built into furniture, laptop or tablet computers, cellular telephones or other electronic devices, or may be other wireless charging equipment. Device 10 is a portable electronic device such as a wristwatch, a cellular telephone, a tablet computer, an electronic pencil or stylus, or other electronic equipment. Illustrative configurations in which device 12 is a tablet computer or similar electronic device and in which device 10 is an electronic accessory that couples with the tablet computer or similar electronic device during wireless power transfer operations may sometimes be described herein as examples. Illustrative configurations in which device 12 is a mat or other equipment that forms a wireless charging surface and in which device 10 is a portable electronic device or electronic accessory that rests on the wireless charging surface during wireless power transfer operations may also sometimes be described herein as examples.

During operation of system 8, a user places one or more devices 10 on or near the charging region of device 12. Power transmitting device 12 is coupled to a source of alternating-current voltage such as alternating-current power source 50 (e.g., a wall outlet that supplies line power or other source of mains electricity), has a battery such as battery 38 for supplying power, and/or is coupled to another source of power. A power converter such as AC-DC power converter 40 can be included to convert power from a mains power source or other AC power source into DC power that is used to power control circuitry 42 and other circuitry in device 12. During operation, control circuitry 42 uses wireless power transmitting circuitry 34 and one or more coils 36 coupled to circuitry 34 to transmit alternating-current electromagnetic signals 48 to device 10 and thereby convey wireless power to wireless power receiving circuitry 46 of device 10.

Power transmitting circuitry 34 has switching circuitry (e.g., transistors in an inverter circuit) that are turned on and off based on control signals provided by control circuitry 42 to create AC current signals through appropriate coils 36. As the AC currents pass through a coil 36 that is being driven by the switching circuitry, a time varying electromagnetic field (wireless power signals 48) is produced, that is received by one or more corresponding coils 14 electrically connected to wireless power receiving circuitry 46 in receiving device 10. If the time varying electromagnetic field is magnetically coupled to coil 14, an AC voltage is induced and a corresponding AC currents flows in coil 14. Rectifier circuitry in circuitry 46 can convert the induced AC voltage in the one or more coils 14 into a DC voltage signals for powering device 10. The DC voltages are used in powering components in device 10 such as display 52, touch sensor components and other sensors 54 (e.g., accelerometers, force sensors, temperature sensors, light sensors, pressure sensors, gas sensors, moisture sensors, magnetic sensors, etc.), wireless communications circuitry 56 for communicating wirelessly with control circuitry 42 of device 12 and/or other equipment, audio components, and other components (e.g., input-output devices 22 and/or control circuitry 20) and/or are used in charging an internal battery in device 10 such as battery 18, or to charge subsequent devices, either wired or wirelessly.

Devices 12 and 10 include control circuitry 42 and 20. Control circuitry 42 and 20 may include storage and processing circuitry such as analogue circuitry, microprocessors, power management units, baseband processors, digital signal processors, field-programmable gate arrays, microcontrollers, application-specific integrated circuits with processing circuits and/or any combination thereof. Control circuitry 42 and 20 is configured to execute instructions for implementing desired control and communications features in system 8. For example, control circuitry 42 and/or 20 may be used in sensing for foreign or other non-receiver objects (e.g. metallic objects such as coins or RFID tags within electronic devices), determining power transmission levels, processing sensor data, processing user input, processing other information such as information on wireless coupling efficiency from transmitting circuitry 34, processing information from receiving circuitry 46, using information from circuitry 34 and/or 46 such as signal measurements on output circuitry in circuitry 34 and other information from circuitry 34 and/or 46 to determine when to start and stop wireless charging operations, adjusting charging parameters such as charging frequencies, coil assignments in a multi-coil array, and wireless power transmission levels, and performing other control functions. Control circuitry 42 and/or 20 may be configured to perform these operations using hardware (e.g. dedicated hardware or circuitry) and/or software (e.g. code that runs on the hardware of system 8). Software code for performing these operations is stored on non-transitory computer readable storage media (e.g. tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 42 and/or 20. The processing circuitry may include application-specific integrated circuits with processing circuitry, one or more microprocessors, or other processing circuitry.

Device 12 and/or device 10 may communicate wirelessly. Devices 10 and 12 may, for example, have wireless transceiver circuitry in control circuitry 42 and 20 (and/or wireless communications circuitry such as circuitry 56 of FIG. 1) that allows wireless transmission of signals between devices 10 and 12 (e.g., using antennas that are separate from coils 36 and 14 to transmit and receive unidirectional or bidirectional wireless signals, using coils 36 and 14 to transmit and receive unidirectional or bidirectional wireless signals, etc.). For example, device 12 and/or device 10 may communicate using in-band communications injected or combined into the wireless power signals 48 such as proposed in the Wireless Power Consortium Qi specification 1.1, which is incorporated herein by reference. Alternatively, a separate Bluetooth®, RFID, NFC, Zigbee, WiFi, RF or other communication system may be employed.

Figure 2:
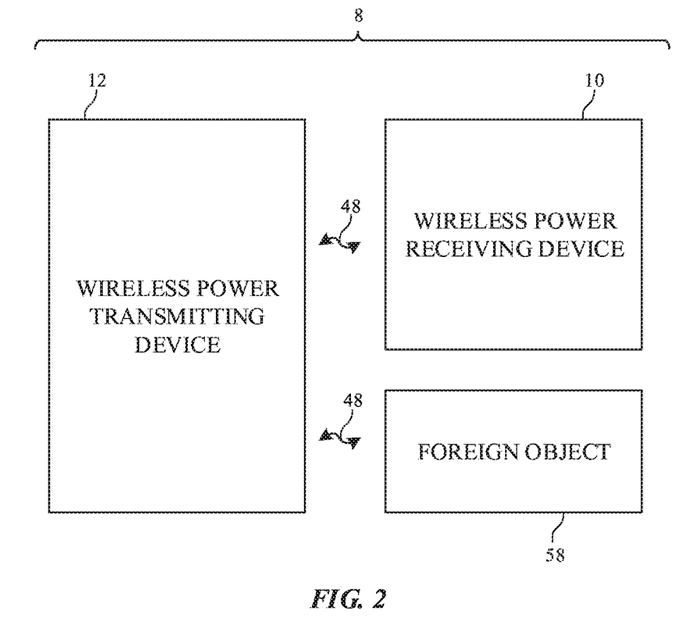
FIG. 2 is a schematic diagram of an illustrative wireless power system including a foreign object.

As previously described, foreign objects may sometimes be located in proximity to the wireless power system. FIG. 2 shows the illustrative wireless power system 8 of FIG. 1 in which a foreign object 58 is present. The foreign object 58 may be, for example, a metallic object like a coin, ring or metallic foil wrapper. The foreign object 58 may have been placed on or near the transmitting device 12 before the device 12 started operating or it may have been introduced after the device 12 started operating. During operation of the wireless power transmitting device 12, the presence of the foreign object 58 may impact the user experience. For example, for a metallic foreign object located in the time varying electromagnetic field 48, a current may be induced in the foreign object 58. This may affect charging efficiency. This also may affect the temperature of foreign object 58. If the foreign object 58 is a coin, for example, a user may be surprised if the coin is heated by the transmitting device.

Figure 3:
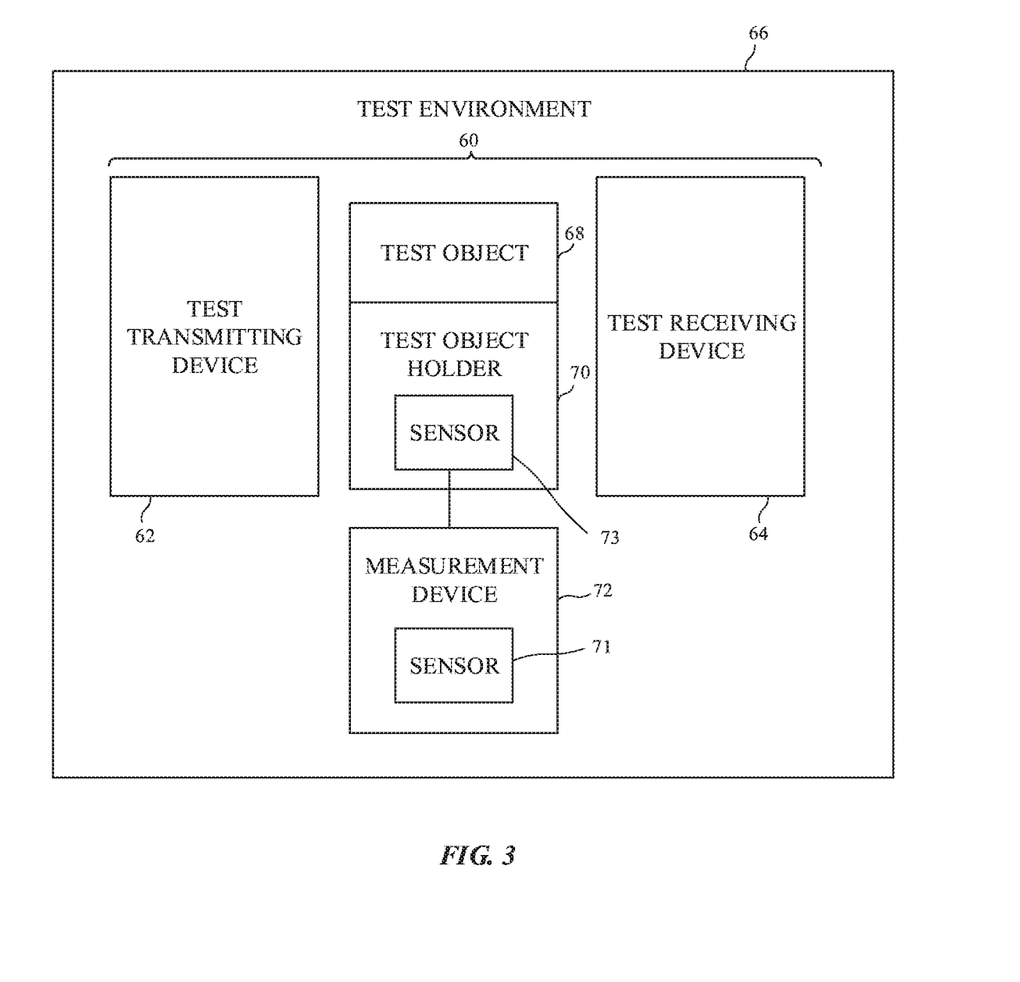
FIG. 3 is a schematic diagram of an illustrative testing system in accordance with some embodiments.

FIG. 3 shows an illustrative testing system 60 for testing the effect of a foreign object in the presence of a device to be tested, for example a device of a wireless power system. The testing system 60 includes a test transmitting device 62 and test receiving device 64. The test transmitting device 62 may have some or all of the features of the transmitting device 12 described above in relation to FIG. 1. The test transmitting device may include a charging surface or a charging volume. Similarly, the test receiving device 63 may have some or all of the features of the receiving device 10 described above in relation to FIG. 1. The test transmitting device 62 and test receiving device 64 are located in a test environment 66. For example, the test environment may be a laboratory, hutch or other suitable room or enclosure. The environment may have stable environmental conditions (e.g., air temperature, air mass flow rate and/or pressure). The test transmitting device 62 and test receiving device 64 are positioned relative to each other so during operation of the test transmitting device 62 wireless power may be transmitted to the test receiving device 64. For example, where the test transmitting device 62 is a charging surface, the test receiving device 64 may be placed onto the charging surface (with possibly the test object positioned therebetween). In another example, where the test transmitting device 62 is a charging volume, the test receiving device 64 may be placed into the charging volume. In both examples, the relative position and orientation of the test receiving device 64 may be specified by the testing standard.

The testing system 60 includes a test object 68. The test object 68 represents a foreign object which might be found in the presence of a wireless power system. The test object may be one of a number of different test objects specified for testing purposes, some of which are described below. The test object 68 is located in a test position. Depending on the type of testing being carried out, the test object may be positioned between the test transmitting device 62 and test receiving device 64 or it may be positioned in another test position specified by the testing standard.

The testing system 60 includes a test object holder 70. As described in more detail below, the test object holder 70 is configured to hold and retain the test object 68 in the test position. While the test object holder 70 in FIG. 3 is shown as distinct from the test object 68, in some example embodiments the test object 68 may also be considered as part of the test object holder 70 (for example, where the test object 68 and test object holder 70 are formed together).

The testing system 60 includes a measurement device 72. The testing system 60 may include various sensors 71, 73 to detect and measure test variables, such as, for example test object temperature and environment temperature. Sensor 71 is shown in FIG. 3 as being within the measurement device 72 and sensor 73 is shown as being provided inside the test object holder 70. Sensor 73 may be a thermometer (for example, a thermocouple) provided on or inside the test object holder 70 to enable measurement of the temperature of the test object 68.

The testing system 60 may be used to carry out testing in accordance with existing testing standards, for example the testing standards specified in WPC Qi Specification v1.2.3 and IEC 62368-1 (Edition 3). Alternatively, or in addition, the testing system 60 may be used to carry out testing in accordance with new testing standards, which may be variants of existing standards or entirely new standards.

Figure 4:
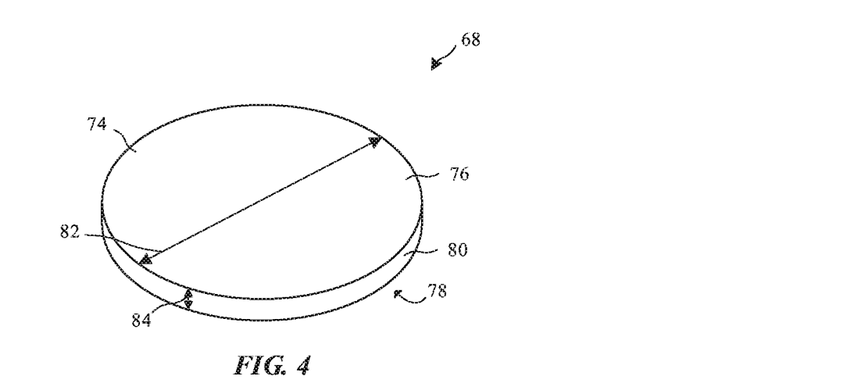
FIG. 4 is a perspective view of a test object according to one embodiment.
Figure 5:
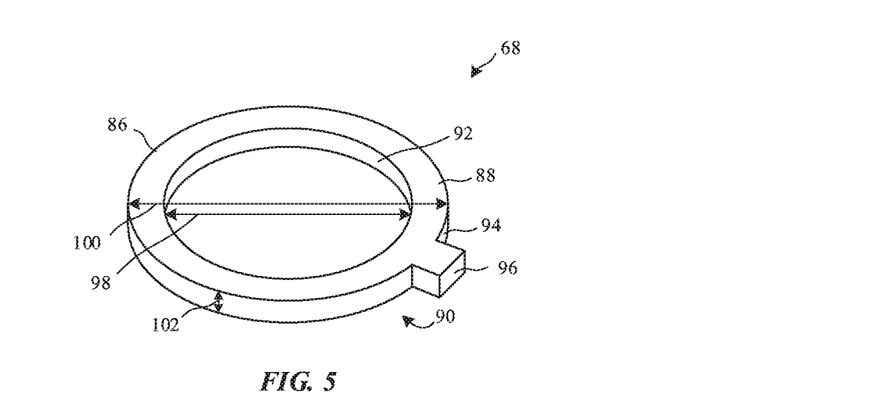
FIG. 5 is a perspective view of a test object according to one embodiment.
Figure 6:
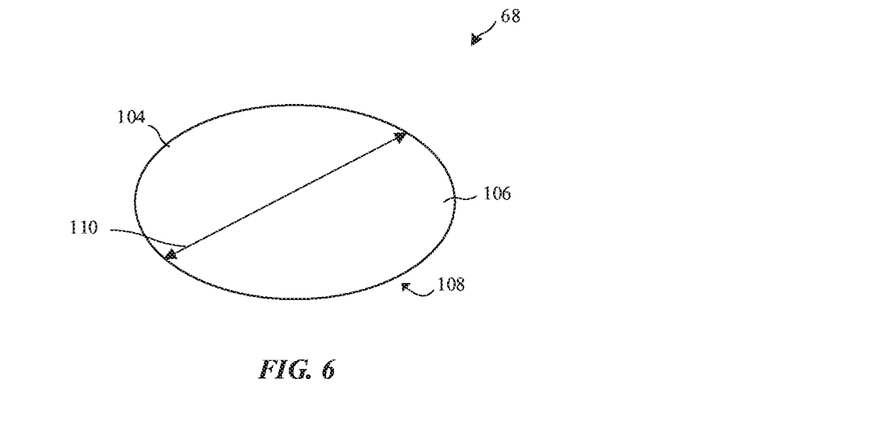
FIG. 6 is a perspective view of a test object according to one embodiment.

FIGS. 4 to 6 show some possible test objects. The shape, size and/or material of the test objects may be specified in a testing standard. In FIG. 4 the test object 68 is a disk 74. The disk 74 is circular. The disk may represent a coin that may be placed in the proximity of a wireless power system. The disk 74 is substantially planar, including a top face 76, a bottom face 78 and a side face 80. The disk 74 may be made of a metallic material such as steel, aluminum, or other specified material. The disk 74 may have a diameter, indicated by arrow 82, between about 10 and 20 mm, 12 and 18 mm, 14 and 16 mm, 14.8 and 15 mm, or that may be about 15 mm. In one example, the disk is constructed of steel and has a diameter in this range. Alternatively, the disk may have a diameter between about 15 and 30 mm, 20 and 25 mm, 21.8 and 22 mm, or that may be about 22 mm. In one example, the disk is constructed of aluminum and has a diameter in this range. The disk 74 may have a thickness between the top face 76 and the bottom face 78, indicated by arrow 84, between about 0.1 and 2.0 mm, 0.3 and 1.5 mm, 0.5 and 1.2 mm, 0.9 mm and 1 mm, or that may be about 1 mm.

In FIG. 5 the test object 68 is a ring 86. The ring may represent, for example, a piece of jewelry that may be placed in the proximity of a wireless power system. The ring 86 is substantially planar, including a top face 88, a bottom face 90, an internal side face 92 and an external side face 94. The ring 86 may include a stub 96 projecting from the external side face 94. A similar stub may also be provided on the disk 74 of FIG. 4. The ring 86 may be made of a metallic material such as steel or aluminum, as well as other specified materials prone to absorb electromagnetic waves emitted from a wireless power transmitting device. The ring 86 may have an inner diameter, indicated by arrow 98, between about 10 and 30 mm, 15 and 25 mm, 19 and 21 mm, 19.8 and 20.2 mm, or that may be about 20 mm. The ring 86 may have an outer diameter, indicated by arrow 100, between about 12 and 32 mm, 17 and 26 mm, 19 and 24 mm, 21.8 and 22 mm, or that may be about 22 mm. The ring 86 may have a thickness between the top face 88 and the bottom face 90, indicated by arrow 102, between about 0.1 and 2.0 mm, 1.3 and 1.5 mm, 0.5 and 1.2 mm, 0.9 and 1 mm, or that may be about 1 mm.

In FIG. 6 the test object 68 is a foil disk 104. The disk may represent, for example, a foil that may be placed in the proximity of a wireless power system. The disk 104 is substantially circular. The foil disk 104 is substantially planar, including a top face 106, a bottom face 108. Due to the thinness of the foil disc, the side face is not visible in FIG. 6. The foil disk 104 may be made of metallic foil such as steel foil, aluminum foil, or other specified material. The foil disk 104 may have an adhesive backing. The foil disk 104 may be a single layer of foil or it may be made of layers of foil stacked together. The foil disk 104 may be made of a single piece of foil folded in half to form two layers. In the case that the foil disk is made of a single piece of foil folded in half, the disk may be substantially circular but with a flat edge at the fold. The foil disk 104 may have a diameter, indicated by arrow 110, between about 10 and 30 mm, 15 mm and 25 mm, 18 mm and 22 mm, 19.8 mm and 20 mm, or that may be about 20 mm. The foil disk 104 may have a thickness between the top face 106 and the bottom face 108 between about 0.01 mm and 1.0 mm, 0.05 mm and 0.5 mm, 0.1 mm and 0.2 mm, or that may be about 0.13 mm. In the case where a sensor is located adjacent the foil disk 104, or between two layers of the foil disk 104, the foil disk may have, in the region of the sensor, a thickness between the top face 106 and the bottom face 108 between about 0.02 mm and about 1 mm, 0.1 mm and 0.8 mm, 0.2 mm and 0.5 mm, or that may less than or equal to 0.5 mm.

While the test objects described in relation to FIGS. 4 to 6 are substantially cylindrical (the disk 74 being a solid cylinder, the ring 86 being a hollowed cylinder and the foil disk being a very short solid cylinder), other shapes of test objects may be specified. Other test objects may include, for example, disks of different dimensions to represent various coins from different currencies.

The test objects may be arranged to thermally couple with sensor 73 so that the sensor can detect and measure the temperature of the test object. For example, in embodiments where the sensor 73 is a thermocouple, the side face of the test object may include a hole into which the sensing junction of a thermocouple may be inserted. The hole may be filled with a suitable thermally conductive compound, for example thermal paste. The depth and diameter of the hole may be specified in the relevant testing standard. In the case of the foil disk 104, if there are multiple layers of foil the sensor may be placed between the layers of foil. A thermally conductive compound, for example thermal paste, may be provided between the layers of foil.

Figure 7:
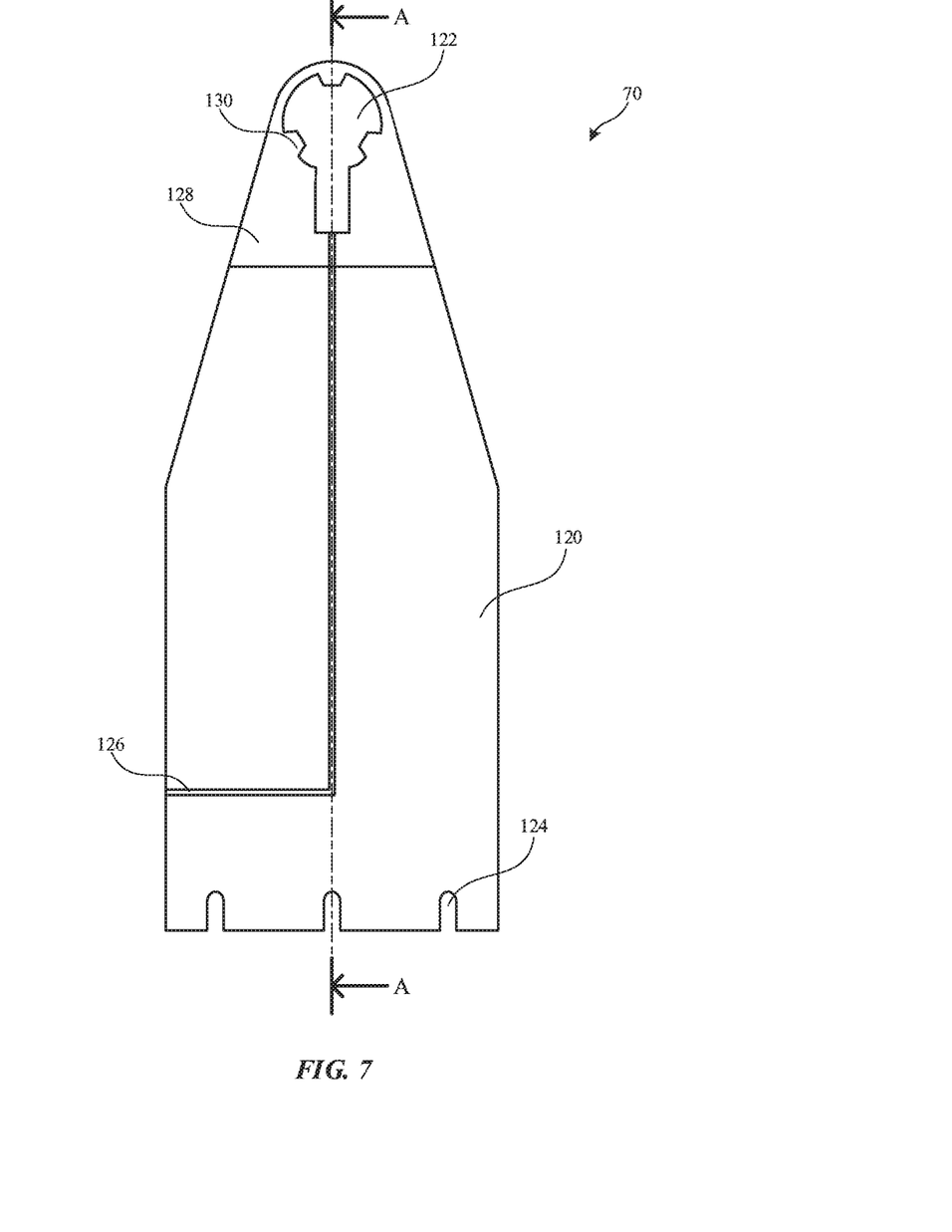
FIG. 7 is a top view of a test object holder according to one embodiment.

FIG. 7 shows a top view of a test object holder 70 according to an example embodiment. The test object is not shown. The test object holder 70 includes a body 120 which in the embodiment shown is generally elongate. The body 120 defines a space or aperture 122 therethrough. The aperture 122 is sized to receive to the test object (not shown in this figure). For example, the aperture 122 may be made larger than the test object such that the test object can be located within the aperture 122 without touching the body 120. Alternatively, the aperture size may be approximately the same as, or slightly smaller than, the diameter of the test object to provide some contact between the test object and the test object holder 70. The test object holder 70 of FIG. 7 includes protrusions 130 that protrude inwardly from the edge of the aperture 122. The protrusions 130 may assist centering of the test object in the aperture 122. Various types and numbers of protrusions could be provided. For example, the holder 70 could include a single protrusion, or two or more protrusions spaced around the aperture edge. In the example of FIG. 7, there are three protrusions 130. The protrusions in this example are sized to make contact with a test object to be located in the aperture 122. In this example, the protrusions 130 are equally spaced around the edge of the aperture 122. The protrusions 130 could be formed from the same material as the rest of the body 120 or from a different material. In this example, the protrusions 130 are the same material as the rest of the body 120. The protrusions could be formed separately from, or integrally with, the rest of the body. In this example, the protrusions 130 are formed integrally with the rest of the body 120.

The test object holder may also include a sheet configured to retain the test object in a desired position relative to the body during testing. The sheet may be an adhesive sheet that adheres to the test object during testing. An adhesive sheet may also adhere to the body of the test object holder. In FIG. 7, an adhesive sheet 128 is shown positioned over the aperture 122. This may allow a test object to be placed within the aperture 122 and in contact with, and thereby adhered to, the adhesive sheet 128. In this example, the adhesive sheet 128 is also placed over a channel 126 provided in the body 120 for a sensing element such as wires of a thermocouple, as described in more detail below. The adhesive sheet 128 can be in the form of adhesive tape. The adhesive sheet 128 may be formed of an electrically insulating material. This may prevent the induction of eddy currents in the adhesive sheet 128 during testing. This may also prevent current induced in the test object from flowing through the adhesive sheet 128. These phenomena may otherwise reduce the reliability or accuracy of test results.

The adhesive sheet 128 should be able to withstand testing conditions. As test objects can heat up during testing, the adhesive sheet 128 may be formed of a heat-resistant material. The heat-resistant material may be configured to withstand temperatures of at least 70° C. The adhesive sheet 128 may be formed from a polymer material. Polymers may provide high strength and flexibility. One suitable class of polymers are polyimides. In the example of FIG. 7, the adhesive sheet 128 is formed from polyimide tape or Kapton tape.

The body 120 of the test object holder 70 may be formed of a relatively rigid or resilient material. This may help support the test object and retain the test object in desired position during testing. The body may be formed from an electrically non-conductive material. The body may be formed from a material with low magnetic permeability. For example, the body 120 could be formed of a composite material or a polymer material. The material could comprise glass fibers, which could be woven or non-woven. The body could comprise epoxy. In one example, the body 120 is formed from glass-reinforced epoxy or fiberglass. In one example, the body is formed from a circuit board substrate such as the material referred to as the National Electrical Manufacturers Association (NEMA) designation FR-4. In other examples, the body may be formed from wood; 3D-printer materials such as polyether ether ketone (PEEK); or phenolic board or phenolic paper or materials referred to as the NEMA designations CEM-1, CEM-2, CEM-3, CEM-4, CEM-5 or G-10.

The test object holder 70 may also include one or more indexing features. These may allow the holder 70 to be retained in one or more desired positions during testing. For example, in a testing system in which the test object holder is held in place by a clamp, the clamp may have one or more corresponding indexing features that engage with the indexing feature(s) of the holder. The indexing feature(s) may be one or more notches or holes formed in the body. In the test object holder 70 of FIG. 7, three indexing features 124 in the form of notches are provided in the body 120 at the end furthest from the aperture 122. The indexing features 124 may be equally spaced from each other.

The test object holder 70 may also include a feature for receiving or retaining a part of a sensor. The part of the sensor may be retained on or in the test object holder 70. For example, the sensor may include one or more wires that lie along a surface of the test object holder 70 or within a channel formed in the test object holder 70. The part of the sensor may also be retained on or in the test object holder 70 by an adhesive sheet such as tape. In the example of FIG. 7, the body 120 of the test object holder 70 has a channel 126 for a wire of the sensor. The channel 126 in this example extends from an outer edge of the body 120 to an edge of the aperture 122. Tape may also be applied over the channel 126 and the wire to retain the wire during testing.

Figure 8:
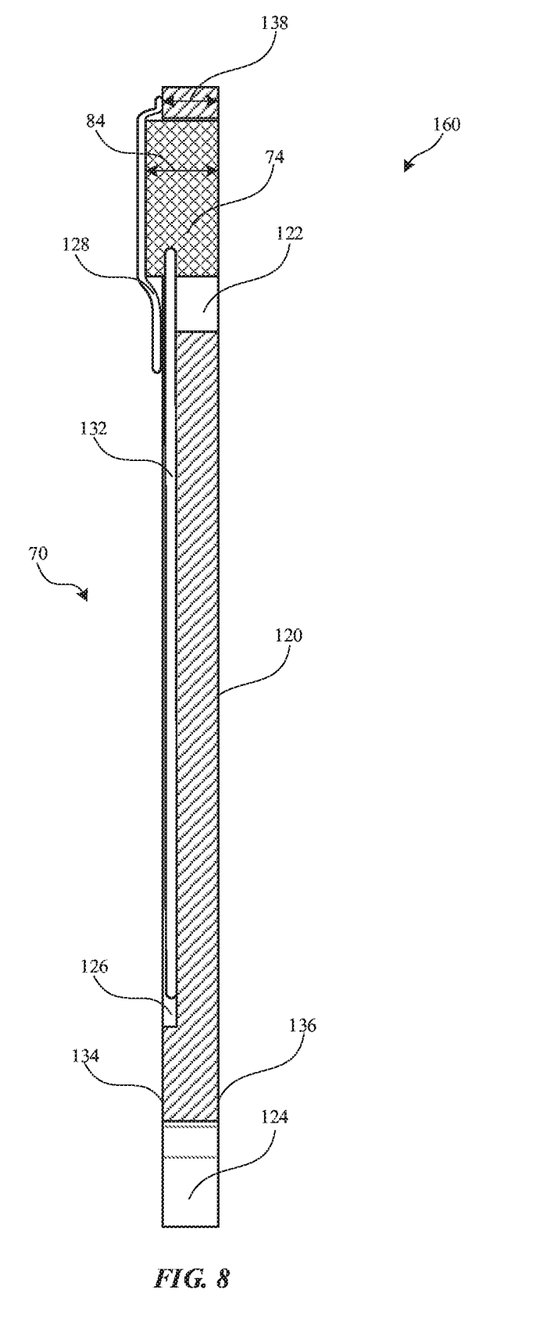
FIG. 8 is cross-sectional view of the test object holder of FIG. 7, including a test object and a sensor.

FIG. 8 shows a cross-sectional view of a testing assembly 160 including the test object holder 70 of FIG. 7, the cross section being taken along line A-A of FIG. 7. In order to show the different elements clearly, certain dimensions in the figure have been exaggerated. In this figure, a test object is shown located in the aperture 122 and a sensor 132 is shown within a channel 126 in the body. In this example, the test object is the disk 74 of FIG. 4, although the holder 70 could be used with the test object of FIG. 5 or another test object. As can be seen, the test object (in this example, disk 74) has a greater thickness than that of the body 120 of the test object holder. Specifically, the disk 74 has a first face (e.g. top face 76), a second face (e.g. bottom face 78), and a distance 84 between the first and second faces, referred to herein as the thickness. The body 120 of the test object holder 70 has a first face 134, a second face 136 and a distance 138 between the first and second faces, referred to herein as the thickness. The thickness 84 of the disk 74 is greater than the thickness 138 of the body 120 of the test object holder 70. This may allow the test object (in this case, disk 74) to be placed in close proximity to a test transmitting device and/or test receiving device during testing. The thickness 138 of the body 120 may be between about 0.05 and 2 mm, between about 0.2 and 1.5 mm, between about 0.6 and 1 mm, or may be about 0.8 mm.

In this example, the sensor is a thermocouple 132 that extends into a hole in the disk 74. The thermocouple 132 is located within a channel 126 in the body 120 of the test object holder 70 and exits the channel 126 at the edge of the aperture 122. The thermocouple 132 traverses part of the aperture 122 from the edge to the disk 74. Providing the thermocouple 132 within the channel 126 may enable the total thickness of the test object holder 70 to be kept relatively low due to the thickness of the thermocouple 132 not contributing to the total thickness. In FIG. 7, tape 128 is provided over the test object (in this example, disk 74) in the region of the aperture 122 and over the channel 126 and thermocouple 132. The tape (or other adhesive sheet) 128 may have a thickness between about 0.02 and 0.1 mm, 0.04 and 0.07 mm, or that may be about 0.05 mm. The combined thickness of the body 120 and the tape 128 may therefore be less than or equal to the thickness 84 of the disk 74, and also less than the combined thickness of the disk 74 and tape 128.

Figure 9:
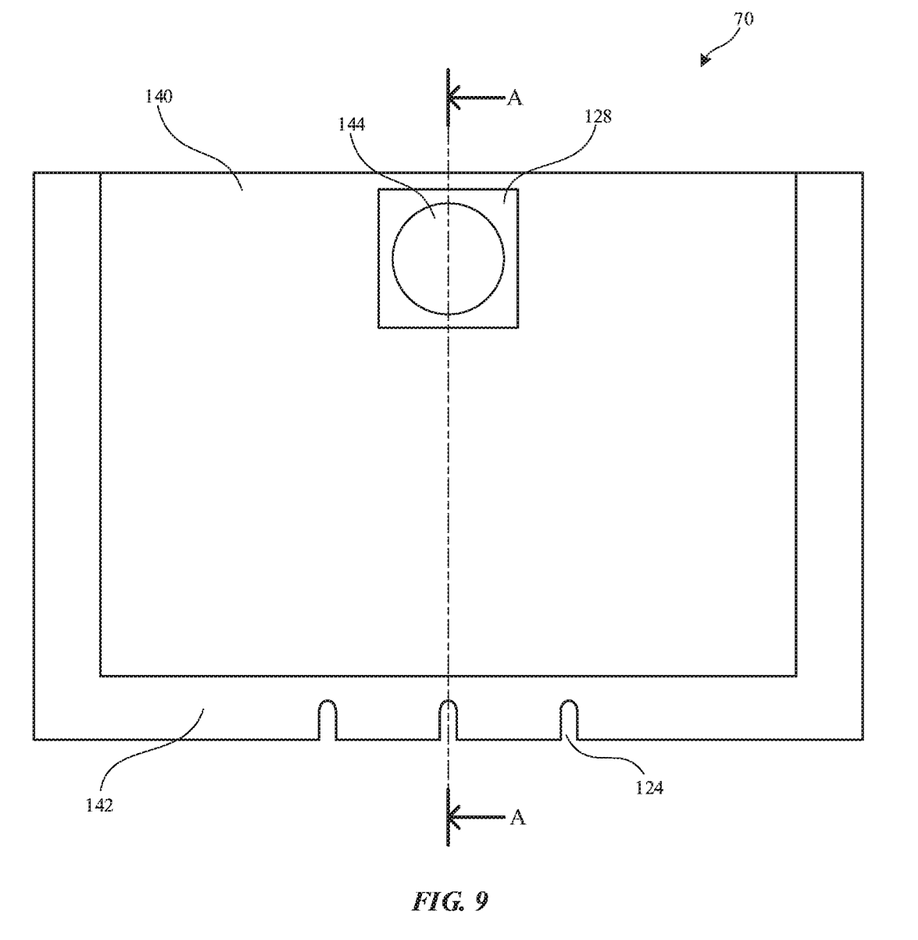
FIG. 9 is a top view of a test object holder according to another embodiment.

FIG. 9 shows an alternative example of the test object holder 70. In this example, the test object holder 70 includes a body in the form of a first sheet 140, a support frame 142 and a second sheet 128. The first sheet 140 includes an aperture 144 in which a test object is to be placed during testing. The first sheet 140 may be formed from a heat-resistant material in order to withstand temperatures attained during testing with a test object. The first sheet 140 may be formed of a thermally insulating material. This may reduce conduction of heat away from the test object during testing, which may otherwise reduce the reliability or accuracy of test results. The first sheet 140 may be formed of an electrically insulating material. This may prevent the induction of eddy currents in the first sheet during testing. This may also prevent current induced in the test object from flowing through the first sheet 140. These phenomena may otherwise reduce the reliability or accuracy of test results. The first sheet 140 may be formed from a natural, synthetic or semi-synthetic polymer. Suitable classes of polymers include polyesters and acetates. In one example, the first sheet 140 is formed from biaxially-oriented polyethylene terephthalate, sometimes marketed under the name Mylar. In other examples, the first sheet 140 may be formed from other polyethylene terephthalate (PET) materials. In another example, the first sheet 140 is formed from cellulose acetate. The thickness of the first sheet 140 may be between about 0.04 and 0.2 mm, 0.08 and 0.15 mm, or may be about 0.1 mm.

The frame 142 is provided at the edges of the first sheet 140. The frame 142 supports the first sheet 140. The frame 142 may be formed of a relatively rigid or resilient material. This may help support the first sheet 140 and test object during testing. For example, the frame 142 could be formed of a composite material or a polymer material. The material could comprise glass fibers, which could be woven or non-woven. The frame 142 could comprise epoxy. In one example, the frame 142 is formed from glass-reinforced epoxy or fiberglass. In one example, the frame 142 is formed from material used for circuit board substrates, such as the material referred to as the National Electrical Manufacturers Association (NEMA) designation FR-4. The thickness of the frame 142 may be between about 0.05 and 2 mm, between about 0.2 and 1.5 mm, between about 0.6 and 1 mm, or may be about 0.8 mm.

The second sheet is configured to retain the test object in place on the first sheet in the first sheet 140 during testing. In particular, it retains the test object in the aperture 144. The sheet may be an adhesive sheet that adheres to the test object during testing. An adhesive sheet may also adhere to the first sheet 140 of the test object holder 70. In FIG. 9, an adhesive sheet 128 is shown positioned over the aperture 144 in the first sheet 140 such as to retain a test object during testing. In this example, the adhesive sheet 128 is also placed over part of the first sheet 140 and part of the frame 142 to retain a sensing element such as wires of a thermocouple, as described in more detail below. The adhesive sheet 128 can be in the form of adhesive tape. The adhesive sheet 128 may be formed of an electrically insulating material. This may reduce the induction of eddy currents in the second sheet during testing. This may also reduce the flow of current induced in the test object through the adhesive sheet 128. These phenomena may otherwise reduce the reliability or accuracy of test results. The adhesive sheet 128 may be the same tape discussed with reference to FIGS. 7 and 8.

The test object holder 70 of FIG. 9 also includes indexing elements 124 as described with respect to the test object holder of FIG. 7.

Figure 10:
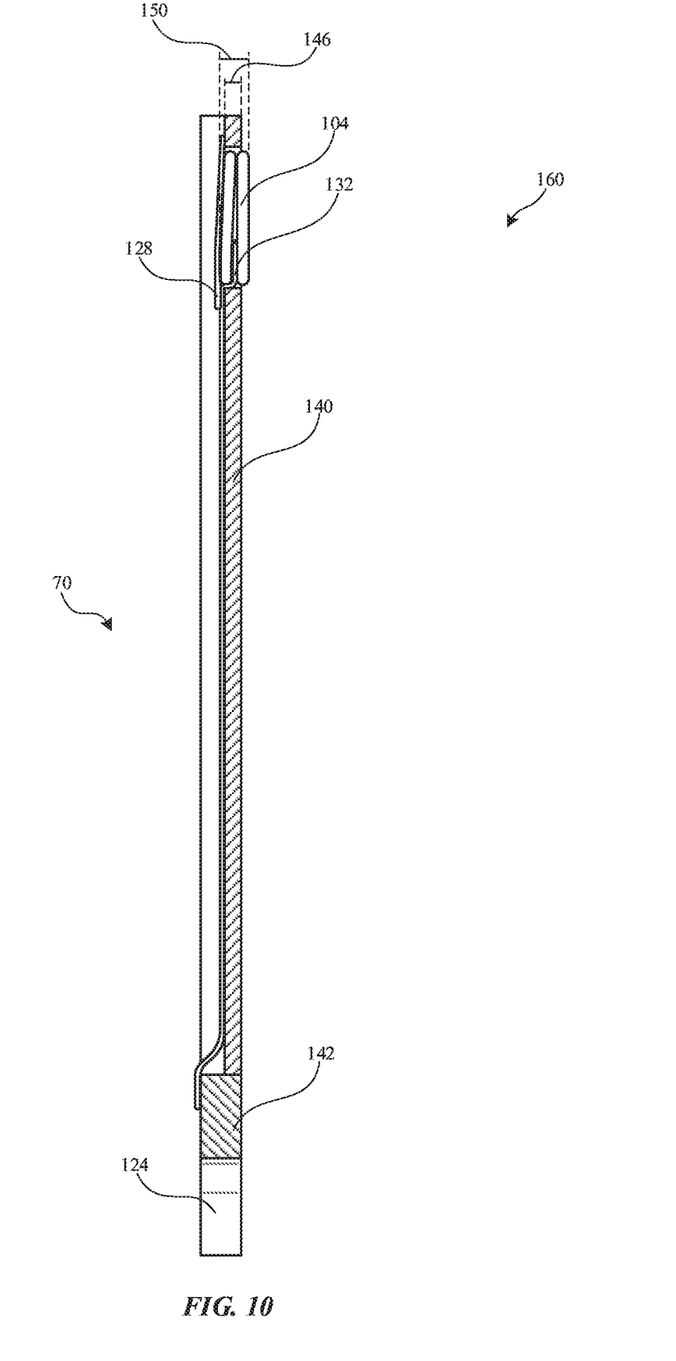
FIG. 10 is a cross-sectional view of the test object holder of FIG. 9, including a test object and a sensor.

FIG. 10 shows a cross-sectional view of a testing assembly 160 including the test object holder 70 of FIG. 9, the cross section being taken along line A-A of FIG. 9. In this figure, a test object is shown located adjacent the first sheet 140 and a sensor 132 is shown between two layers of the test object. In this example, the test object is the foil disk 104 of FIG. 6, but the test object holder 70 could be used with other test objects. In order to show the different elements clearly, certain dimensions in the figure have been exaggerated. In this example, the sensor is a thermocouple 132 that extends along the surface of the first sheet 140 to the foil disk 104. In FIG. 10, the second sheet, in the form of adhesive tape 128, is provided over the foil disk 104 and over the thermocouple 132. Also visible in this figure are the frame 142 and one of the indexing notches 124.

As can be seen in FIG. 10, the first sheet 140, which forms the body of the test object holder 70, has a thickness 146. The test object has a thickness 150. As can be seen in this example, the thickness of the test object (in this example, foil disk 104) is greater than the thickness of the first sheet 140. In the case where the test object is the foil disk 104, there may be a sensing junction of a thermocouple adjacent the foil disk 104 or between two layers of the foil disk 104. In this scenario, the greatest thickness of the foil disk would be in the region of the thermocouple.

Figure 11:
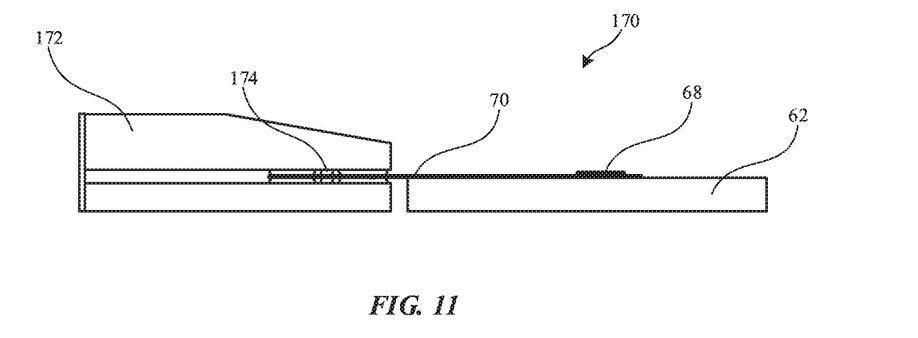
FIG. 11 is a side view of a testing system according to one embodiment.

FIG. 11 shows an example of a testing system 170. The testing system includes a test object holder 70 and a clamp 172 configured to hold the test object holder. This figure also shows a test object transmitting device 62. The clamp 172 includes one or more indexing features 174 that cooperate with an indexing feature of the test object holder 70. This may enable the test object holder 70 to be retained in one or more discrete positions during testing. By extension, this may enable the test object 68 to be retained in one or more discrete positions with respect to test devices such as the test transmitting device 62. This may improve the repeatability and reproducibility of tests, as the test object holder 70 may easily and accurately placed in one of the discrete positions with respect to the clamp 172, either manually by a human operator or by a machine. The indexing features 174 of the clamp 172 may include one or more pins or other protrusions. These would be arranged to cooperate with one or more notches, holes or recesses of the test object holder 70. The indexing features 174 of the clamp 172 may include one or more holes, notches or other recesses. These would be arranged to cooperate with one or more pins or other protrusions of the test object holder 70. For example, the test object holder 70 may include three notches as shown in FIG. 7 or FIG. 9. The clamp may include a pin which, in use, is located in one of the notches of the test object holder 70. This provides three different positions for the test object holder 70 relative to the clamp 172. A handle or other grip may be provided on the test object holder 70 for gripping by a human operator or a machine.

The indexing features of the clamp and test object holder may facilitate use in an automated testing environment. The test object holder may be able to be quickly and accurately located in the clamp in the correct position because the discrete relative positions allowed by the indexing features may prevent, or at least reduce the likelihood of, the test object holder being placed in an incorrect position with respect to the clamp.

The foregoing is merely illustrative and various modifications can be made to the described embodiments. The foregoing embodiments may be implemented individually or in any combination, and elements from one embodiment may be combined with others.

What is claimed is:

1. A testing assembly for testing a performance of at least one wireless power transfer device to be tested in the presence of a foreign object, the testing assembly comprising:
   a test object representing a foreign object that might be found in the presence of a wireless power system, wherein the test object comprises a first face, a second face opposite the first face, and a thickness between the first face and the second face; and
   a test object holder, the test object holder comprising:
      a body having an aperture defined therethrough, wherein the body has a first face, a second face opposite the first face, and a thickness between the first face of the body and the second face of the body, and wherein the thickness of the body is less than or equal to the thickness of the test object, and the test object is located within the aperture during testing; and
      an adhesive sheet positioned over the aperture and the test object;
      wherein the test object holder holds and retains the test object in a specified test position relative to the at least one wireless power transfer device to be tested.

2. The testing assembly of claim 1, wherein the at least one wireless power transfer device to be tested is a wireless power transmitting device and the testing assembly further comprises a wireless power receiving device and the test object is located between the wireless power transmitting device and the wireless power receiving device.

3. The testing assembly of claim 1, wherein the adhesive sheet comprises polyimide or Kapton tape.

4. The testing assembly of claim 1, wherein the test object is made of steel.

5. The testing assembly of claim 1, wherein the test object is made of aluminum.

6. The testing assembly of claim 1, wherein the test object is a ring having an outer diameter between 21.8 mm and 22 mm and an inner diameter between 19.8 mm and 20 mm.

7. The testing assembly of claim 1, further comprising a temperature sensor that measures the temperature of the test object.

8. The testing assembly of claim 7, wherein the temperature sensor is a thermocouple.

9. The testing assembly of claim 1, wherein the thickness of test object is between 0.9 mm and 1 mm and the thickness of the body is between 0.6 mm and 1 mm.

10. The testing assembly of claim 9, wherein the thickness of the body is 0.8 mm.

11. The testing assembly of claim 1, wherein the thickness of the test object is less than or equal to 0.5 mm and the thickness of the body is between 0.04 mm and 0.2 mm.

12. The testing assembly of claim 11, wherein the thickness of the test object is between 0.1 mm and 0.2 mm.

13. The testing assembly of claim 12, wherein the thickness of the test object is 0.13 mm.

14. The testing assembly of claim 1, wherein the test object holder comprises one or more indexing features.

15. The testing assembly of claim 14, wherein the indexing features comprise one or more notches at an edge of the test object holder.

16. The testing assembly of claim 15, wherein the one or more notches comprise three equally-spaced notches.

17. The testing assembly of claim 1, wherein the test object is a disk.

18. The testing assembly of claim 17, wherein the test object has a diameter between 14.8 mm and 15 mm.

19. The testing assembly of claim 17, wherein the test object has a diameter between 19.8 mm and 20 mm.

20. The testing assembly of claim 17, wherein the test object has a diameter between 21.8 mm and 22 mm.

21. The testing assembly of claim 1, wherein the body comprises a rigid material.

22. The testing assembly of claim 21, wherein the body is formed from FR-4.

23. The testing assembly of claim 21, wherein the body comprises glass fibers.

24. The testing assembly of claim 23, wherein the body comprises epoxy.

25. The testing assembly of claim 1, wherein the test object holder further comprises a support frame adapted to support the body.

26. The testing assembly of claim 25, wherein the support frame is formed from FR-4.

27. The testing assembly of claim 25, wherein the support frame comprises glass fibers.

28. The testing assembly of claim 27, wherein the support frame comprises epoxy.

29. The testing assembly of claim 25, wherein the body comprises a sheet of resilient polymer material.

30. The testing assembly of claim 29, wherein the polymer material is biaxially-oriented polyethylene terephthalate.

31. The testing assembly of claim 29, wherein the polymer material is cellulose acetate.

32. A testing assembly for testing performance of at least one wireless power transfer device to be tested in the presence of a foreign object, the testing assembly comprising:
- a conductive test object representing a foreign object that might be found in the presence of a wireless power system, the test object having a thickness defined by opposing first and second faces; and
- a test object holder, the test object holder comprising:
  - a rigid body having an aperture defined therethrough and having a thickness defined by opposing first and second faces with the thickness of the body being less than or equal to the thickness of the test object, wherein the test object is disposed within the aperture during testing; and
  - a non-conductive adhesive sheet positioned over the aperture and the test object to secure the test object relative to the test object holder;
  - wherein the test object holder retains the test object in a specified test position relative to the at least one wireless power transfer device.

33. The testing assembly of claim 32, further comprising a temperature sensor configured to measure the temperature of the test object.

34. The testing assembly of claim 32, wherein the at least one wireless power transfer device to be tested is a wireless power transmitting device and the testing assembly further comprises a wireless power receiving device and the test object is located between the wireless power transmitting device and the wireless power receiving device.

35. The testing assembly of claim 32, wherein the rigid body is formed from FR-4.

36. The testing assembly of claim 32, wherein the adhesive sheet comprises polyimide or Kapton tape.

37. The testing assembly of claim 32, wherein the thickness of test object is between 0.9 mm and 1 mm and the thickness of the body is between 0.6 mm and 1 mm.

38. The testing assembly of claim 32, wherein the test object is a disk having a diameter selected from one of the following ranges:
- 14.8 mm to 15 mm;
- 19.8 mm to 20 mm; and
- 21.8 mm to 22 mm.

39. The testing assembly of claim 32, wherein the test object is a ring having an outer diameter between 21.8 mm and 22 mm and an inner diameter between 19.8 mm and 20 mm.

40. The testing assembly of claim 32, wherein the rigid body comprises glass fibers.

41. The testing assembly of claim 40, wherein the rigid body comprises epoxy.

42. The testing assembly of claim 32, wherein the test object holder comprises one or more indexing features.

43. The testing assembly of claim 42, wherein the indexing features comprise one or more notches at an edge of the test object holder.

44. The testing assembly of claim 43, wherein the one or more notches comprise three equally-spaced notches.

45. A testing assembly for testing a performance of at least one wireless power transfer device to be tested in the presence of a foreign object, the testing assembly comprising:
- a conductive test object representing a foreign object that might be found in the presence of a wireless power system, the test object having a thickness defined by opposing first and second faces; and
- a test object holder, the test object holder comprising:
  - a resilient polymer sheet having an aperture defined therethrough and having a thickness defined by opposing first and second faces with the thickness of the resilient polymer sheet being less than or equal to the thickness of the test object, wherein the test object is disposed within the aperture during testing;
  - a rigid frame that supports the resilient polymer sheet; and
  - a non-conductive adhesive sheet positioned over the aperture and the test object to secure the test object relative to the test object holder;
  - wherein the test object holder retains the test object in a specified test position relative to the at least one wireless power transfer device.

46. The testing assembly of claim 45, further comprising a temperature sensor configured to measure the temperature of the test object.

47. The testing assembly of claim 45, wherein the at least one wireless power transfer device to be tested is a wireless power transmitting device and the testing assembly further comprises a wireless power receiving device and the test object is located between the wireless power transmitting device and the wireless power receiving device.

48. The testing assembly of claim 45, wherein the rigid frame that supports the resilient polymer sheet is formed from FR-4.

49. The testing assembly of claim 45, wherein the resilient polymer sheet is biaxially-oriented polyethylene terephthalate.

50. The testing assembly of claim 45, wherein the resilient polymer sheet is cellulose acetate.

51. The testing assembly of claim 45, wherein the adhesive sheet comprises polyimide or Kapton tape.

52. The testing assembly of claim 45, wherein the test object is a disk having a diameter selected from one of the following ranges:

14.8 mm to 15 mm;
19.8 mm to 20 mm; and
21.8 mm to 22 mm.

53. The testing assembly of claim 45, wherein the test object is a ring having an outer diameter between 21.8 mm and 22 mm and an inner diameter between 19.8 mm and 20 mm.

54. The testing assembly of claim 45, wherein the rigid frame that supports the resilient polymer sheet comprises glass fibers.

55. The testing assembly of claim 54, wherein the rigid frame that supports the resilient polymer sheet comprises epoxy.

56. The testing assembly of claim 45, wherein the thickness of the test object is less than or equal to 0.5 mm and the thickness of the is between 0.04 mm and 0.2 mm.

57. The testing assembly of claim 56, wherein the thickness of the test object is between 0.1 mm and 0.2 mm.

58. The testing assembly of claim 57, wherein the thickness of the test object is 0.13 mm.

59. The testing assembly of claim 45, wherein the test object holder comprises one or more indexing features.

60. The testing assembly of claim 59, wherein the indexing features comprise one or more notches at an edge of the test object holder.

61. The testing assembly of claim 60, wherein the one or more notches comprise three equally-spaced notches.

\* \* \* \* \*

UNITED STATES PATENT AND TRADEMARK OFFICE
CERTIFICATE OF CORRECTION

PATENT NO. : 11,437,861 B2
APPLICATION NO. : 16/546201
DATED : September 6, 2022
INVENTOR(S) : Daman Kapoor et al.

It is certified that error appears in the above-identified patent and that said Letters Patent is hereby corrected as shown below:

In the Claims

Column 13, Claim 32, Line 30, please insert --a-- between "testing" and "performance".

Column 15, Claim 56, Line 16, please insert --resilient polymer sheet-- after "of the" and before "is between".

Signed and Sealed this
Twenty-eighth Day of March, 2023

Katherine Kelly Vidal
*Director of the United States Patent and Trademark Office*